US010310646B2

(12) United States Patent
Chen et al.

(10) Patent No.: US 10,310,646 B2
(45) Date of Patent: Jun. 4, 2019

(54) TOUCH DISPLAY PANEL, TOUCHING DISPLAY DEVICE HAVING REDUCED SIGNAL INTERFERENCES AND DRIVING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Huabin Chen, Beijing (CN); Ruirui Wang, Beijing (CN); Bin Feng, Beijing (CN); Jianfeng Yuan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 329 days.

(21) Appl. No.: 15/105,551

(22) PCT Filed: Jan. 14, 2016

(86) PCT No.: PCT/CN2016/070864
§ 371 (c)(1),
(2) Date: Jun. 16, 2016

(87) PCT Pub. No.: WO2017/024769
PCT Pub. Date: Feb. 16, 2017

(65) Prior Publication Data
US 2017/0205920 A1 Jul. 20, 2017

(30) Foreign Application Priority Data
Aug. 10, 2015 (CN) .......................... 2015 1 0485047

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 3/0416* (2013.01); *G06F 2203/04111* (2013.01)

(58) Field of Classification Search
CPC ...... G06F 3/044; G06F 3/0412; G06F 3/0416; G06F 3/047
(Continued)

(56) References Cited

U.S. PATENT DOCUMENTS

2008/0122800 A1* 5/2008 Meng .................... G06F 3/0412 345/173
2010/0225608 A1* 9/2010 Zhou ................... G02F 1/13338 345/173
(Continued)

FOREIGN PATENT DOCUMENTS

CN 101718765 A 6/2010
CN 101738765 6/2010
(Continued)

OTHER PUBLICATIONS

International Search Report and Written Opinion with English Language Translation, dated Apr. 28, 2016, Application No. PCT/CN2016/070864.
(Continued)

*Primary Examiner* — Adam J Snyder
(74) *Attorney, Agent, or Firm* — Womble Bond Dickinson (US) LLP

(57) ABSTRACT

This disclosure discloses a touch display panel, a driving method thereof and a touch display device. The touch display panel comprises a first substrate and a second substrate aligned with each other; a first signal transmission line and a second signal transmission line arranged on the first substrate, the second signal transmission line intersecting with the first signal transmission line; gate lines and data
(Continued)

lines arranged on the second substrate, the second substrate being further provided with a first signal output end and a second signal output end led out from the gate lines and arranged alternately; and a first spacer corresponding to the first signal transmission line and a second spacer corresponding to the second signal transmission line.

21 Claims, 5 Drawing Sheets

(58) Field of Classification Search
USPC ........................................ 345/173; 178/18.01
See application file for complete search history.

(56) References Cited

U.S. PATENT DOCUMENTS

2010/0309146 A1* 12/2010 Lee ....................... G06F 3/0412 345/173
2011/0075059 A1* 3/2011 Shih .................... G02F 1/13338 349/12
2011/0134060 A1* 6/2011 Sung ..................... G06F 3/0412 345/173
2014/0204285 A1 7/2014 Jang
2015/0380467 A1* 12/2015 Su ......................... H01L 27/323 257/40
2016/0117039 A1 4/2016 Zhao
2016/0147332 A1* 5/2016 Wang ...................... G06F 3/044 345/174
2016/0342251 A1 11/2016 Chen et al.

FOREIGN PATENT DOCUMENTS

CN 101825787 9/2010
CN 101825787 A 9/2010
CN 102650914 8/2012
CN 102650914 A 8/2012
CN 103970353 8/2014
CN 103970353 A * 8/2014 ............. G06F 3/044
CN 103970353 A 8/2014
CN 104298404 A 1/2015
CN 104503622 A 4/2015
CN 105045425 11/2015

OTHER PUBLICATIONS

Office Action received for Chinese Patent Application No. 201510485047.6, dated Nov. 30, 2017, 20 pages (13 pages of English Translation and 7 pages of Office Action).
International Preliminary Report on Patentability received for PCT Patent Application No. PCT/CN2016/070864, dated Feb. 22, 2018, 14 pages (9 pages of English Translation and 5 pages of Original Document).
Office Action in Chinese Application No. 201510485047.6 dated Jul. 13, 2017, with English translation.

* cited by examiner

TOUCH DISPLAY PANEL, TOUCHING DISPLAY DEVICE HAVING REDUCED SIGNAL INTERFERENCES AND DRIVING METHOD THEREOF

The present application is the U.S. national phase entry of PCT/CN2016/070864, with an international filling date of Jan. 14, 2016, which claims the benefit to Chinese Patent Application No. 201510485047.6, filed on Aug. 10, 2015, the entire disclosures of which are incorporated herein by reference.

FIELD

This disclosure relates to the field of display technologies, and in particular to a touch display panel, a driving method thereof and a touch display device.

BACKGROUND ART

With constant progress in flat panel display technologies, touch screens have been widely applied to display devices such as notebooks, monitors and TVs. By using a touch screen, it is only necessary to touch by a finger symbols or characters on a display screen of a display device to achieve operation of the display device, which makes human-machine interactions more direct. Touch screens also have many other advantages such as robust durability, rapid responsivity, space saving and easy communication.

The touch screens can be divided into three types: out-cell, on-cell and in-cell, according to a difference in positions of touch sensors. For an out-cell touch screen, the touch sensors are directly formed on a display panel, which increases the general cell thickness and decreases the transmittivity. For an on-cell touch screen, the touch sensors are formed on an outer side of a counter substrate of a display panel. Thus, although the general cell thickness is reduced, a process for manufacturing a counter substrate is added. Differently, in an in-cell touch screen, the touch sensors are directly formed inside a display panel, which not only avoids the general cell thickness increase, but also enables manufacture of the touch sensor together with the display panel, thereby simplifying the manufacture process. By virtue of the above advantages, the in-cell technique has been more and more popular in the field of display and has gradually become the mainstream.

Currently, for designs of an in-cell touch screen, there are mainly three types: a resistive type, a capacitive type, and an optical type. According to the existing designs of an in-cell touch screen, touch signal transmission lines are often arranged on an array substrate. As a result, the touch signal transmission lines occupy a certain area of the array substrate, which influences the aperture ratio of the touch display panel.

Chinese patent application No. CN103970353A discloses a touch display panel, wherein touch signal transmission lines are arranged on a counter substrate instead of an array substrate, and wherein two spacers are used to achieve electrical connection between the signal transmission lines and a common electrode on the array substrate in a touch state. In this case, a touch region can be precisely sensed, and the aperture ratio of the touch display panel is ensured since the touch signal transmission lines will not occupy an area of the array substrate.

However, no matter whether the touch signal transmission lines are positioned on the array substrate or on the counter substrate, generally in a method for driving a touch display panel in the prior art, one of the two touch signal transmission lines on axis X and axis Y is used for driving scanning, and the other is used for sensing. In other words, individual drive scanning for touch control is required in this case. Besides, as can be understood by those skilled in the art, in order to drive pixels for display, it is also necessary to apply a drive scanning signal to the gate lines on the array substrate. As can be seen, in a conventional touch display panel, there are generally two kinds of drive scanning: one for driving display and the other for driving touch sensing. Therefore, signal interferences between these two kinds of drive scanning often occur, which gives rise to problems such as imprecise determination of the touch position and low accuracy for the touch display screen.

SUMMARY

A goal of embodiments of this disclosure is to provide a touch display panel, a driving method thereof and a touch display device, for at least solving problems such as drive signal interferences caused by using one touch signal transmission line for driving scanning and the other for sensing in the prior art.

In order to meet the above goal, in one aspect, the embodiments of this disclosure provide a touch display panel. The touch display panel comprises a first substrate and a second substrate aligned with each other. The touch display panel further comprises: a first signal transmission line and a second signal transmission line arranged on the first substrate, the second signal transmission line intersecting with the first signal transmission line; gate lines and data lines arranged on the second substrate, the second substrate being further provided with a first signal output end and a second signal output end led out from the gate lines and arranged alternately; as well as a first spacer corresponding to the first signal transmission line and a second spacer corresponding to the second signal transmission line, the first spacer being used for achieving electrical connection between the first signal transmission line and the first signal output end when a corresponding touch region is in a touch state, and the second spacer being used for achieving electrical connection between the second signal transmission line and the second signal output end when the corresponding touch region is in a touch state.

According to the touch display panel of this disclosure, when the corresponding touch region is in a touch state, touch signals applied to the gate lines on the second substrate will be transmitted to the first signal transmission line and the second signal transmission line via the first signal output end and the second signal output end as well as the first spacer and the second spacer respectively. In this case, by detecting output signals with a detection element, a touch position can be easily determined and thus accurate multi-point touch control can be achieved. As compared with the prior art in which the first signal transmission line is used for driving and the second signal transmission line is used for sensing or vice versa, the technical solution provided in this disclosure performs drive scanning by using the gate lines instead of the first signal transmission line or the second signal transmission line, which not only avoids influences on the aperture ratio of the touch panel, but also alleviates problems such as signal interferences between two kinds of drive scanning caused by concurrent use of the drive scanning on the gate lines for driving both display and touch sensing.

In a possible implementation, the touch display panel provided in the embodiments of this disclosure further comprises a second insulating layer formed on the second substrate comprising the gate lines and the data lines. Via holes penetrating the second insulating layer are filled with an electrically conductive material, such that the electrically conductive material extends to a position corresponding to the first spacer and is exposed to an uppermost layer of the second substrate so as to obtain the first signal output end. And via holes penetrating the second insulating layer are filled with an electrically conductive material, such that the electrically conductive material extends to a position corresponding to the second spacer and is exposed to an uppermost layer of the second substrate so as to obtain the second signal output end.

Specifically, the electrically conductive material is an Indium Tin Oxide (ITO) material.

By means of via holes extending to a surface of the gate lines and ITO material filling the via holes, the first signal output end and the second signal output end can be easily led out from the gate lines, which promotes the electrical connections with the first signal transmission line and the second signal transmission line via the first spacer and the second spacer respectively.

Furthermore, the second insulating layer comprises a gate insulating layer sandwiched between the gate line layer and the data line layer, as well as a passivation layer positioned over the data line layer. The gate insulating layer is used for insulating the gate lines and the data lines from each other, and the passivation layer is used for protecting the data lines against undesired electrical connection.

In a possible implementation, the second signal output end is further connected in series with a thin film transistor switch. The thin film transistor switch is used for preventing possible short circuits between the gate lines when the corresponding touch region is in a touch state.

Specifically, the thin film transistor switch comprises a gate, a gate insulating layer and an active layer sequentially arranged in the same layer as the gate lines, as well as a source and a drain arranged in the same layer as the data lines. Via holes penetrating the gate insulating layer and the passivation layer as well as via holes penetrating the passivation layer are both filled with an electrically conductive material, such that the source is electrically connected with the gate lines. And via holes penetrating the passivation layer are filled with an electrically conductive material, such that the drain is electrically connected with the electrically conductive material exposed to the uppermost layer of the second substrate.

In a possible implementation, the first signal transmission line is an array of sensors for determining transversal coordinates in the corresponding touch region, and the second signal transmission line is an array of sensors for determining longitudinal coordinates in the corresponding touch region. With such two-dimensional discrete arrays of sensors, coordinates of the touch position can be determined by using the transversal and longitudinal positions of sensors simultaneously outputting sensing signals, when the corresponding touch region is in a touch state.

In a possible implementation, an insulating shield layer between the first signal transmission line and the second signal transmission line is provided at an intersection of the first signal transmission line and the second signal transmission line. The insulating shield layer is used for avoiding interconnection of the first signal transmission line and the second signal transmission line.

In a possible implementation, the first signal transmission line is formed by a metal wire, and the second signal transmission line is formed by a metal wire and an electrically conductive bridging structure. Specifically, the electrically conductive bridging structure is made of an ITO material. With the bridging structure, while implementing the first signal transmission line and the second signal transmission line, insulation between them can be ensured.

In a possible implementation, the first spacer and the second spacer are both arranged on the first substrate. Specifically, a bottom of the first spacer is electrically connected with a side of the first signal transmission line close to the second substrate, wherein when the corresponding touch region is in a non-touch state, a top of the first spacer is spaced from the first signal output end on the second substrate at a certain distance, and when the corresponding touch region is in a touch state, the top of the first spacer is in contact with the first signal output end on the second substrate. Further, a bottom of the second spacer is electrically connected with a side of the second signal transmission line close to the second substrate, wherein when the corresponding touch region is in a non-touch state, a top of the second spacer is spaced from the second signal output end on the second substrate at a certain distance, and when the corresponding touch region is in a touch state, the top of the second spacer is in contact with the second signal output end on the second substrate.

Specifically, by coating surfaces of corresponding spacers and surfaces of corresponding signal transmission lines with an electrically conductive material and forming electrically conductive paths therebetween, electrical connections between the first spacer and the first signal transmission line, as well as between the second spacer and the second signal transmission line are achieved respectively. Furthermore, the electrically conductive material is an ITO material, and the electrically conductive paths are also made of an ITO material.

Furthermore, a first insulating layer is further provided on the first signal transmission line and the second signal transmission line. Via holes penetrating the first insulating layer and corresponding to the first signal transmission line and the second signal transmission line respectively are filled with an electrically conductive material, so as to achieve electrical connections between the first spacer and the first signal transmission line, as well as between the second spacer and the second signal transmission line respectively.

In a possible implementation, the first spacer and the second spacer are both arranged on the second substrate. Specifically, a bottom of the first spacer is electrically connected with the first signal output end on the second substrate, wherein when the corresponding touch region is in a non-touch state, a top of the first spacer is spaced from the first signal transmission line on the first substrate at a certain distance, and when the corresponding touch region is in a touch state, the top of the first spacer is in contact with the first signal transmission line on the first substrate. Further, a bottom of the second spacer is electrically connected with the second signal output end on the second substrate, wherein when the corresponding touch region is in a non-touch state, a top of the second spacer is spaced from the second signal transmission line on the first substrate at a certain distance, and when the corresponding touch region is in a touch state, the top of the second spacer is in contact with the second signal transmission line on the first substrate.

Specifically, by coating surfaces of corresponding spacers and surfaces of corresponding signal output ends with an electrically conductive material and forming electrically conductive paths therebetween, electrical connections between the first spacer and the first signal output end, as well as between the second spacer and the second signal output end are achieved respectively. Furthermore, the electrically conductive material is an ITO material, and the electrically conductive paths are also made of an ITO material.

Furthermore, a first insulating layer is further provided on the first signal transmission line and the second signal transmission line. Via holes penetrating the first insulating layer and corresponding to the first signal transmission line and the second signal transmission line respectively are filled with an electrically conductive material, such that the electrically conductive material extends to positions corresponding to the first spacer and the second spacer respectively.

Furthermore, when the corresponding touch region is in a touch state, contacts of the first spacer and the second spacer with an opposite substrate are achieved respectively by means of deformation of the first substrate. Specifically, the first substrate has a certain amount of deformation. Thereby, when the corresponding touch region is touched, the first substrate will be deformed at a corresponding touch position such that the first spacer and the second spacer become in contact with the opposite substrate, thereby achieving electrical connections between the first signal transmission line and the first signal output end, as well as between the second signal transmission line and the second signal output end respectively.

In a possible implementation, the first substrate is a color filter substrate, and the second substrate is an array substrate. In this case, the first signal transmission line and the second signal transmission line are arranged on the color filter substrate instead of the array substrate, which ensures the aperture ratio of the touch display panel.

In a possible implementation, the first spacer and the second spacer are spherical or columnar.

In a possible implementation, the first substrate further comprises a black matrix layer, wherein the first signal transmission line and the second signal transmission line are arranged on a side of the black matrix layer close to the second substrate. The black matrix layer can be made of non-conductive components such as resin and graphite, and used for shielding regions between adjacent pixel electrodes on the second substrate such that light will not exit from these gap regions, which avoids possible problems such as light leakage and contrast decrease in the touch display panel.

In a possible implementation, the first signal transmission line on the first substrate extends in the same direction as the gate lines on the second substrate, and the second signal transmission line on the first substrate extends in the same direction as the data lines on the second substrate. Such an extension correspondence can promote electrical connections between the first signal transmission line and the first signal output end as well as between the second signal transmission line and the second signal output end, when the corresponding touch region is in a touch state.

In a possible implementation, the touch display panel further comprises a primary spacer positioned between the first substrate and the second substrate for maintaining a general cell thickness of the touch display panel. The primary spacer is in physical contact with the first substrate and the second substrate. Such a primary spacer effectively avoids problems such as changes in the cell thickness that may arise during transmission and treatment of the touch display panel, and thus ensures homogeneity of the general cell thickness.

In another aspect, the embodiments of this disclosure further provide a touch display device, comprising the touch display panel described above.

In yet another aspect, the embodiments of this disclosure further provide a method for driving the touch display panel described above. The method comprises steps as follows: applying a scanning signal to the gate lines on the second substrate; and detecting output signals at the first signal transmission line and the second signal transmission line on the first substrate respectively, wherein if the corresponding touch region is in a touch state, an intersection position of the first signal transmission line and the second signal transmission line where corresponding output signals are detected simultaneously is determined as a touch position.

In this case, by leading out the first signal output end and the second signal output end on the gate lines, a scanning signal usually applied to the gate lines during display can be used as a touch signal at the same time. Specifically, as can be easily understood by those skilled in the art, the scanning signal can be a square wave signal. Thus, individual scanning signals for touch sensing will not be required, which simplifies the panel structure and meanwhile avoids problems such as interferences between different scanning signals in case of multiple scanning signals.

Like what is described above about the touch display panel, with the touch display device and the method for driving a touch display panel provided in this disclosure, a touch position can be easily determined and thus accurate multi-point touch control can be achieved. Besides, drive scanning is performed by using the gate lines instead of the first signal transmission line or the second signal transmission line, which not only avoids influences on the aperture ratio of the touch panel, but also alleviates problems such as signal interferences between two kinds of drive scanning caused by concurrent use of the drive scanning on the gate lines for driving both display and touch sensing.

DETAILED DESCRIPTION OF EMBODIMENTS

Figure 1:
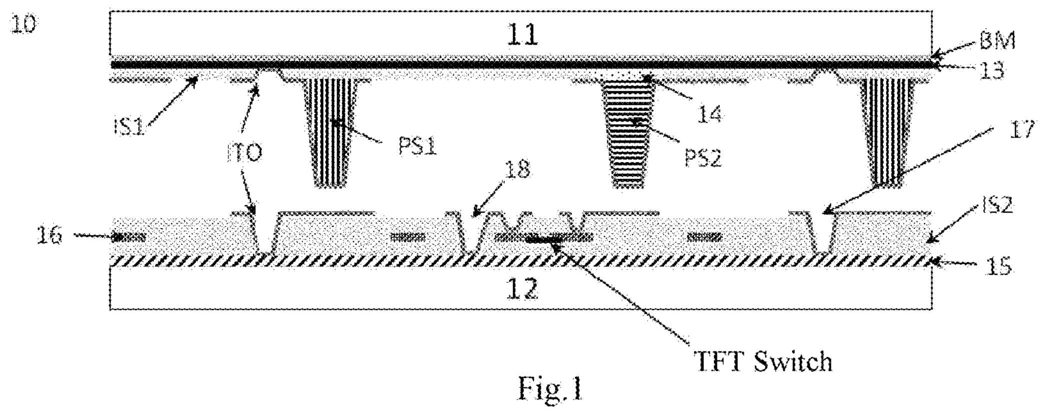
FIG. 1 is a schematic cross-sectional view of a touch display panel according to embodiments of this disclosure.

The touch display panel, the driving method thereof and the touch display device provided in the embodiments of this disclosure shall be described in detail as follows with reference to the drawings. It should be noted that same reference signs are used for indicating same or similar parts or elements throughout the drawings. The drawings are not necessarily drawn to scale, as some parts or elements may be exaggerated in order to explain principles of this disclosure. Besides, positional relations of different elements relative to each other in the drawings are only provided for the purpose of explaining principles of this disclosure, rather than indicating that this disclosure is limited to the positional relations described or illustrated therein.

Figure 2A:
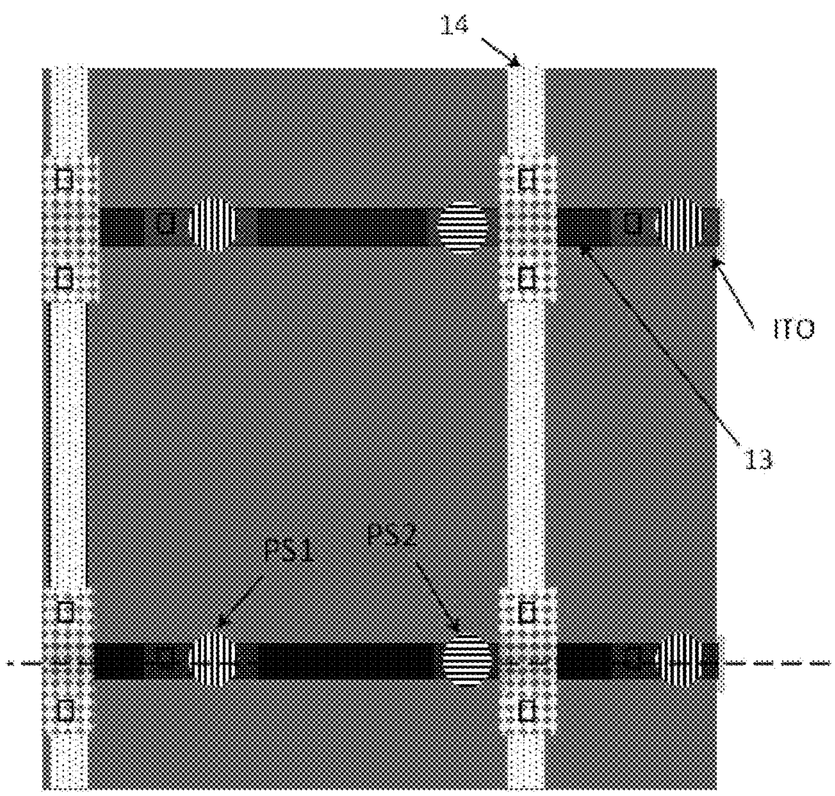
FIGS. 2*a* and 2*b* are respectively schematic top views of a first substrate and a second substrate of the touch display panel as shown in FIG. 1.
Figure 2B:
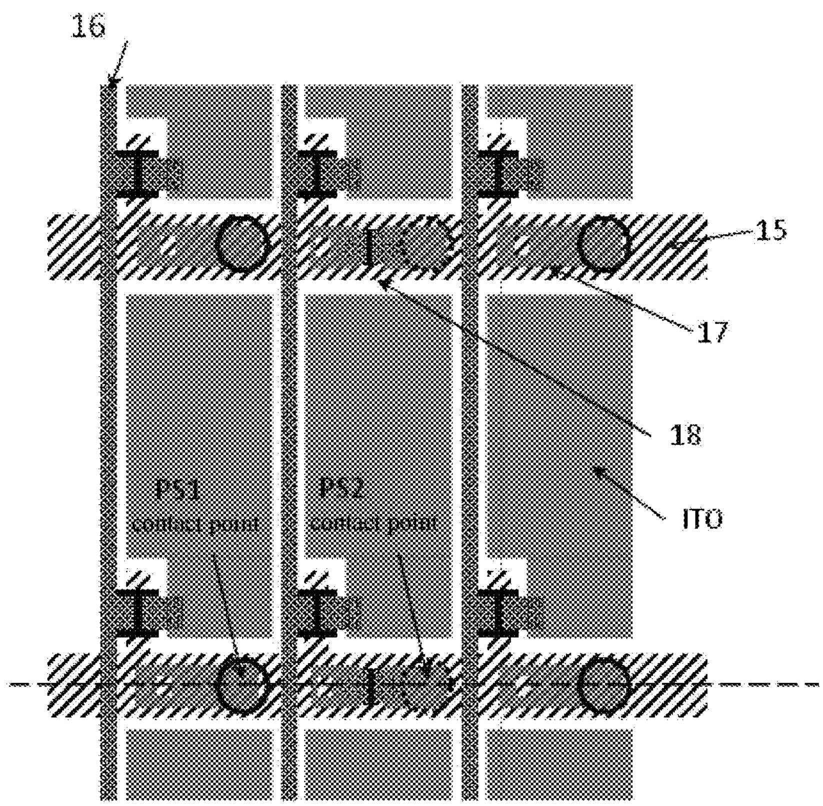

Now specifically referring to FIGS. 1-4, the touch display panel provided in the embodiments of this disclosure shall be described in detail. FIGS. 1 and 2 respectively show a schematic cross-sectional view and top views of a touch display panel according to the embodiments of this disclosure. As shown in the drawings, the touch display panel 10 comprises a first substrate 11 and a second substrate 12 aligned with each other. The touch display panel 10 further comprises: a first signal transmission line 13 and a second signal transmission line 14 arranged on the first substrate 11, the second signal transmission line 14 intersecting with the first signal transmission line 13; gate lines 15 and data lines 16 arranged on the second substrate 12, the second substrate 12 being further provided with a first signal output end 17 and a second signal output end 18 led out from the gate lines 15 and arranged alternately; as well as a first spacer PS1 corresponding to the first signal transmission line 13 and a second spacer PS2 corresponding to the second signal transmission line 14, the first spacer PS1 being used for achieving electrical connection between the first signal transmission line 13 and the first signal output end 17 when a corresponding touch region is in a touch state, and the second spacer PS2 being used for achieving electrical connection between the second signal transmission line 14 and the second signal output end 18 when the corresponding touch region is in a touch state. It should be noted that for the sake of simplicity, FIG. 1 shows two first spacers PS1, one second spacer PS2, two first signal output ends 17 and one second signal output end 18, but this disclosure is not limited thereto.

As can be understood by those skilled in the art, the touch display panel 10 can further comprise a second insulating layer formed on the second substrate 12 comprising the gate lines 15 and the data lines 16, as is indicated by reference number IS2 in the drawings. Specifically, the second insulating layer IS2 can comprise a gate insulating layer sandwiched between the gate line 15 layer and the data line 16 layer, as well as a passivation layer positioned over the data line 16 layer. The gate insulating layer is used for insulating the gate lines and the data lines from each other, and the passivation layer is used for protecting the data lines against undesired electrical connection. Besides, the gate insulating layer can be made of a silicon nitride material. In this case, in order to form the first signal output end 17 and the second signal output end 18 led out from the gate lines 15 as described in this disclosure, via holes penetrating the second insulating layer IS2 can be filled with an ITO material, such that the ITO material extends to a position corresponding to the first spacer PS1 and is exposed to an uppermost layer of the second substrate 12; and via holes penetrating the second insulating layer IS2 can be filled with an ITO material, such that the ITO material extends to a position corresponding to the second spacer PS2 and is exposed to an uppermost layer of the second substrate 12. In this way, the first signal output end 17 and the second signal output end 18 can be easily led out from the gate lines 15, and electrical connections with the first signal transmission line 13 and the second signal transmission line 14 via the first spacer PS1 and the second spacer PS2 can be promoted respectively.

Furthermore, the second signal output end 18 formed in such a manner can be further connected in series with a thin film transistor switch (i.e., the TFT switch as shown in FIG. 1). The thin film transistor switch comprises a gate, a gate insulating layer and an active layer sequentially arranged in the same layer as the gate lines 15, as well as a source and a drain arranged in the same layer as the data lines 16. Via holes penetrating the gate insulating layer and the passivation layer as well as via holes penetrating the passivation layer are both filled with an ITO material, such that the source of the TFT switch is electrically connected with the gate lines 15. Via holes penetrating the passivation layer are filled with an ITO material, such that the drain of the TFT switch is electrically connected with the electrically conductive material exposed to the uppermost layer of the second substrate 12. In this case, by means of a one-directional conduction effect of the TFT switch, possible short circuits can be avoided between the gate lines 15 when the corresponding touch region is in a touch state.

Furthermore, the first signal transmission line 13 and the second signal transmission line 14 as shown in FIG. 1 can be an array of sensors for determining transversal coordinates in the corresponding touch region and an array of sensors for determining longitudinal coordinates in the corresponding touch region respectively. With such two-dimensional discrete arrays of sensors, coordinates of a touch position can be determined by using specific positions of sensors simultaneously outputting sensing signals, when the corresponding touch region is in a touch state.

Furthermore, an insulating shield layer between the first signal transmission line 13 and the second signal transmission line 14 can be further arranged at an intersection of the first signal transmission line 13 and the second signal transmission line 14. The insulating shield layer can be used for avoiding connection between the first signal transmission line 13 and the second signal transmission line 14.

Furthermore, the first signal transmission line 13 is formed by a metal wire, and the second signal transmission line 14 is formed by a metal wire and an electrically conductive bridging structure. Specifically, in this embodiment, the electrically conductive bridging structure is made of an ITO material. Referring to FIG. 2*a*, the ITO bridging structure is shown with diamond shadow regions between segments of the second signal transmission line 14. With the ITO bridging structure, while implementing the first signal transmission line 13 and the second signal transmission line 14, insulation between them can be ensured.

As shown in FIGS. 1 and 2, the first spacer PS1 and the second spacer PS2 can be both arranged on the first substrate 11. Specifically, a bottom of the first spacer PS1 is electrically connected with a side of the first signal transmission line 13 close to the second substrate 12, wherein when the corresponding touch region is in a non-touch state, a top of the first spacer PS1 is spaced from the first signal output end 17 on the second substrate 12 at a certain distance, and when the corresponding touch region is in a touch state, the top of the first spacer PS1 is in contact with the first signal output end 17 on the second substrate 12. Further, a bottom of the second spacer PS2 is electrically connected with a side of the second signal transmission line 14 close to the second substrate 12, wherein when the corresponding touch region is in a non-touch state, a top of the second spacer PS2 is spaced from the second signal output end 18 on the second substrate 12 at a certain distance, and when the corresponding touch region is in a touch state, the top of the second spacer PS2 is in contact with the second signal output end 18 on the second substrate 12. Specifically, by coating surfaces of corresponding spacers PS1, PS2 and surfaces of corresponding signal transmission lines 13, 14 with an electrically conductive material and forming electrically conductive paths therebetween, electrical connections between the first spacer PS1 and the first signal transmission line 13, as well as between the second spacer PS2 and the second signal transmission line 14 are achieved respectively. Furthermore, the electrically conductive material can be an ITO material, and the electrically conductive paths can also be made of an ITO material.

Exemplarily, as shown in FIG. 1, a first insulating layer (as indicated by reference number IS1 in the drawing) is further provided on the first signal transmission line 13 and the second signal transmission line 14. Via holes penetrating the first insulating layer IS1 and corresponding to the first signal transmission line 13 and the second signal transmission line 14 respectively are filled with an ITO material, so as to achieve electrical connections between the first spacer PS1 and the first signal transmission line 13, as well as between the second spacer PS2 and the second signal transmission line 14 respectively.

It should be noted that although the spacers PS1 and PS2 are shown as formed on the corresponding first signal transmission line 13 and second signal transmission line 14 respectively in FIGS. 1 and 2, this disclosure is not limited thereto. As can be understood by those skilled in the art, the spacers PS1 and PS2 can be disposed at different positions on the first substrate 11, as long as electrical connections can be achieved respectively between the first signal output end 17 and the first signal transmission line 13, as well as between the second signal output end 18 and the second signal transmission line 14, when the corresponding touch region is in a touch state.

Figure 3:
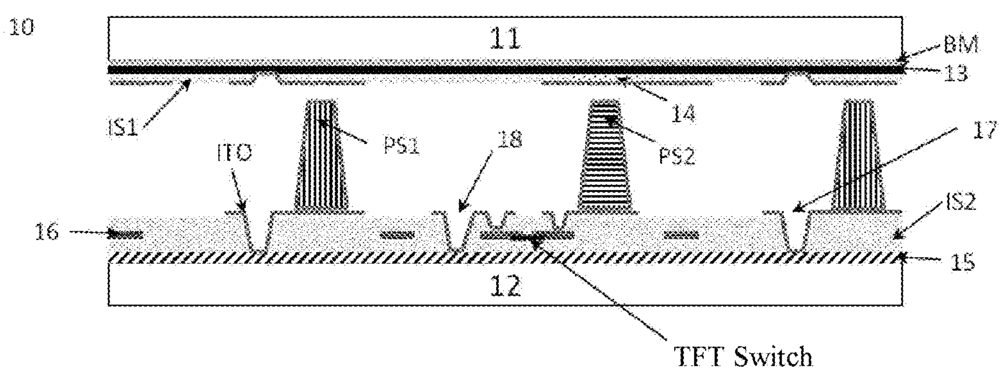
FIG. 3 is a schematic cross-sectional view of another touch display panel according to embodiments of this disclosure.
Figure 4A:
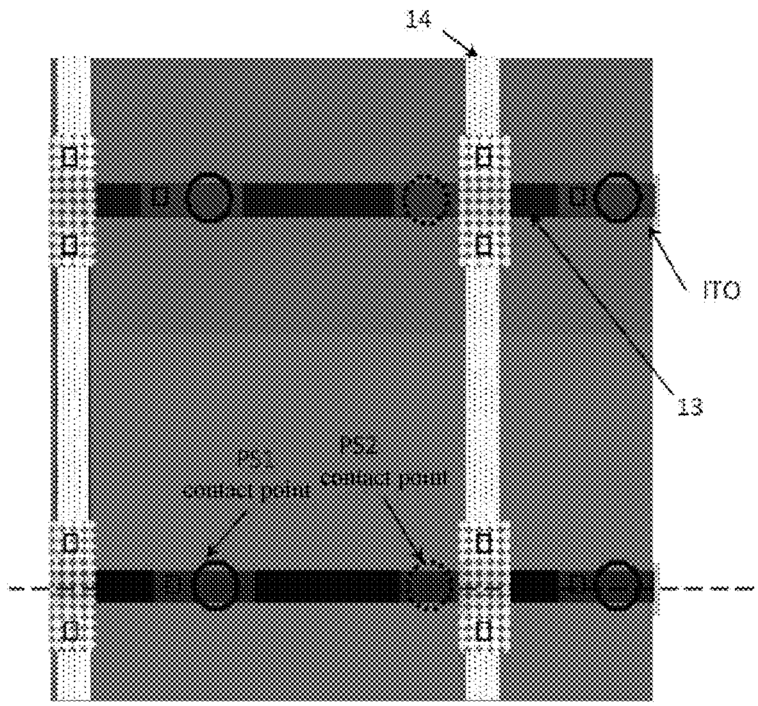
FIGS. 4*a* and 4*b* are respectively schematic top views of a first substrate and a second substrate of the touch display panel as shown in FIG. 3.
Figure 4B:
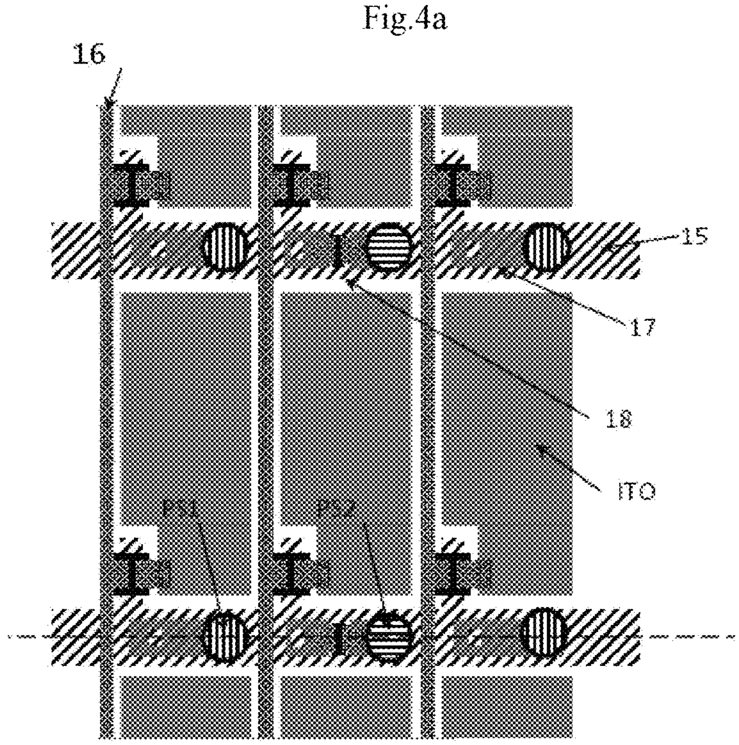

Besides, as can be easily understood by those skilled in the art, the first spacer PS1 and the second spacer PS2 do not have to be both arranged on the first substrate 11. And instead, they can be arranged freely as long as electrical connections can be achieved respectively between the first signal transmission line 13 and the first signal output end 17, as well as between the second signal transmission line 14 and the second signal output end 18, when the corresponding touch region is in a touch state. Alternatively, as shown in FIGS. 3 and 4, the first spacer PS1 and the second spacer PS2 can be both arranged on the second substrate 12. Specifically, a bottom of the first spacer PS1 is electrically connected with the first signal output end 17 on the second substrate 12, wherein when the corresponding touch region is in a non-touch state, a top of the first spacer PS1 is spaced from the first signal transmission line 13 on the first substrate 11 at a certain distance, and when the corresponding touch region is in a touch state, the top of the first spacer PS1 is in contact with the first signal transmission line 13 on the first substrate 11. Further, a bottom of the second spacer PS2 is electrically connected with the second signal output end 18 on the second substrate 12, wherein when the corresponding touch region is in a non-touch state, a top of the second spacer PS2 is spaced from the second signal transmission line 14 on the first substrate 11 at a certain distance, and when the corresponding touch region is in a touch state, the top of the second spacer PS2 is in contact with the second signal transmission line 14 on the first substrate 11. Specifically, by coating surfaces of corresponding spacers PS1, PS2 and surfaces of corresponding signal output ends 17, 18 with an electrically conductive material and forming electrically conductive paths therebetween, electrical connections between the first spacer PS1 and the first signal output end 17, as well as between the second spacer PS2 and the second signal output end 18 are achieved respectively. Furthermore, the electrically conductive material can be an ITO material, and the electrically conductive paths can also be made of an ITO material.

Exemplarily, as shown in FIG. 3, a first insulating layer (as indicated by reference number IS1 in the drawing) is further arranged on the first signal transmission line 13 and the second signal transmission line 14. Via holes penetrating the first insulating layer IS1 and corresponding to the first signal transmission line 13 and the second signal transmission line 14 respectively are filled with an ITO material, such that the ITO material extends to positions corresponding to the first spacer PS1 and the second spacer PS2 respectively. In this way, electrical connections of the first signal output end 17 and the second signal output end 18 with the first signal transmission line 13 and the second signal transmission line 14 via the first spacer PS1 and the second spacer PS2 respectively are promoted.

It should be noted that the first spacer PS1 and the second spacer PS2 are not limited to be wedge-shaped as described in the specific explanations of this disclosure or as shown in the drawings. As can be understood by those skilled in the art, the two spacers PS1 and PS2 can be formed in various other shapes such as a spherical shape or a columnar shape, as long as they can implement the functions respectively.

Specifically, the first substrate can be made of a deformable material with a certain amount of deformation. Thereby, when the corresponding touch region is in a non-touch state, the first spacer PS1 and the second spacer PS2 according to the embodiments of this disclosure are not in physical contact with an opposite substrate. Once the corresponding touch region is touched, the first substrate according to the embodiments of this disclosure will be deformed due to a touch pressure at a corresponding touch position, such that the first spacer PS1 and the second spacer PS2 that were not in physical contact with the opposite substrate become in contact therewith. Thus, by means of deformation of the first substrate, physical contact of the first spacer PS1 and the second spacer PS2 with the opposite substrate can be promoted. Thereby, electrical connections between the first signal transmission line and the first signal output end, as well as between the second signal transmission line and the second signal output end are achieved respectively.

Furthermore, the first substrate 11 can further comprise a black matrix layer BM. In this case, the first signal transmission line 13 and the second signal transmission line 14 can be arranged on a side of the black matrix layer BM close to the second substrate 12. The black matrix layer BM can be made of non-conductive components such as resin and graphite, and used for shielding regions between adjacent pixel electrodes on the second substrate 12 such that light will not exit from these gap regions, which avoids possible problems such as light leakage and contrast decrease in the touch display panel 10.

Furthermore, referring to FIGS. 1 and 3, the first signal transmission line 13 on the first substrate 11 can extend in the same direction as the gate lines 15 on the second substrate 12, and the second signal transmission line 14 on the first substrate 11 can extend in the same direction as the data lines 16 on the second substrate 12. Such an extension correspondence can promote electrical connections between the first signal transmission line 13 and the first signal output end 17, as well as between the second signal transmission line 14 and the second signal output end 18, when the corresponding touch region is in a touch state.

Furthermore, the touch display panel 10 can further comprise a primary spacer (not shown) positioned between the first substrate 11 and the second substrate 12 for maintaining a general cell thickness of the touch display panel 10. The primary spacer is in physical contact with the first substrate 11 and the second substrate 12. In contrast with the first spacer PS1 and the second spacer PS2 in the embodiments of this disclosure, the primary spacer is used for ensuring homogeneity of the general cell thickness, so it should remain in contact with the first substrate 11 and the second substrate 12.

According to another aspect of this disclosure, a method for driving the above touch display panel 10 is further provided. Now referring to FIG. 5, the method for driving the touch display panel 10 according to this disclosure shall be described in detail.

Figure 5A:
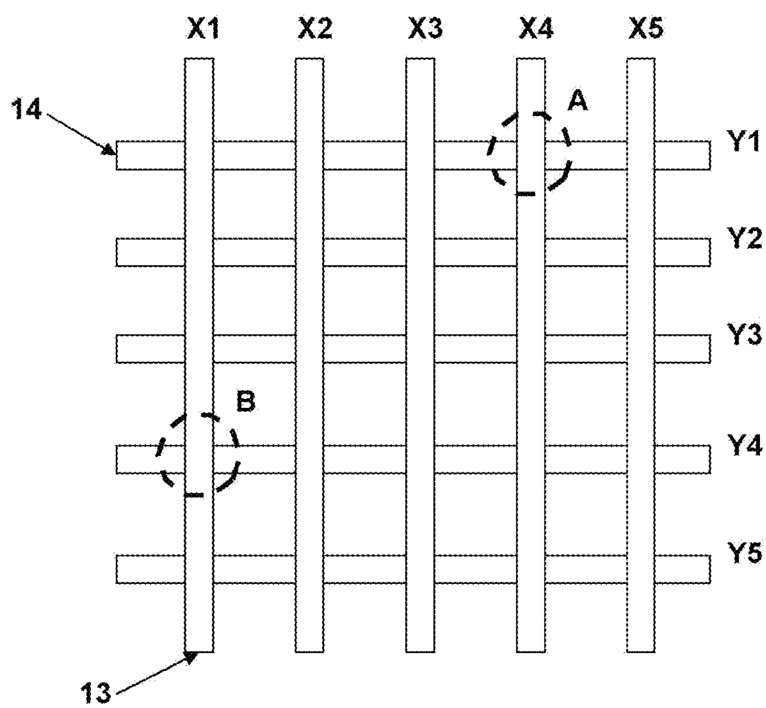
FIGS. 5*a* and 5*b* are schematic views for explaining a driving process for a touch display panel according to embodiments of this disclosure.
Figure 5B:
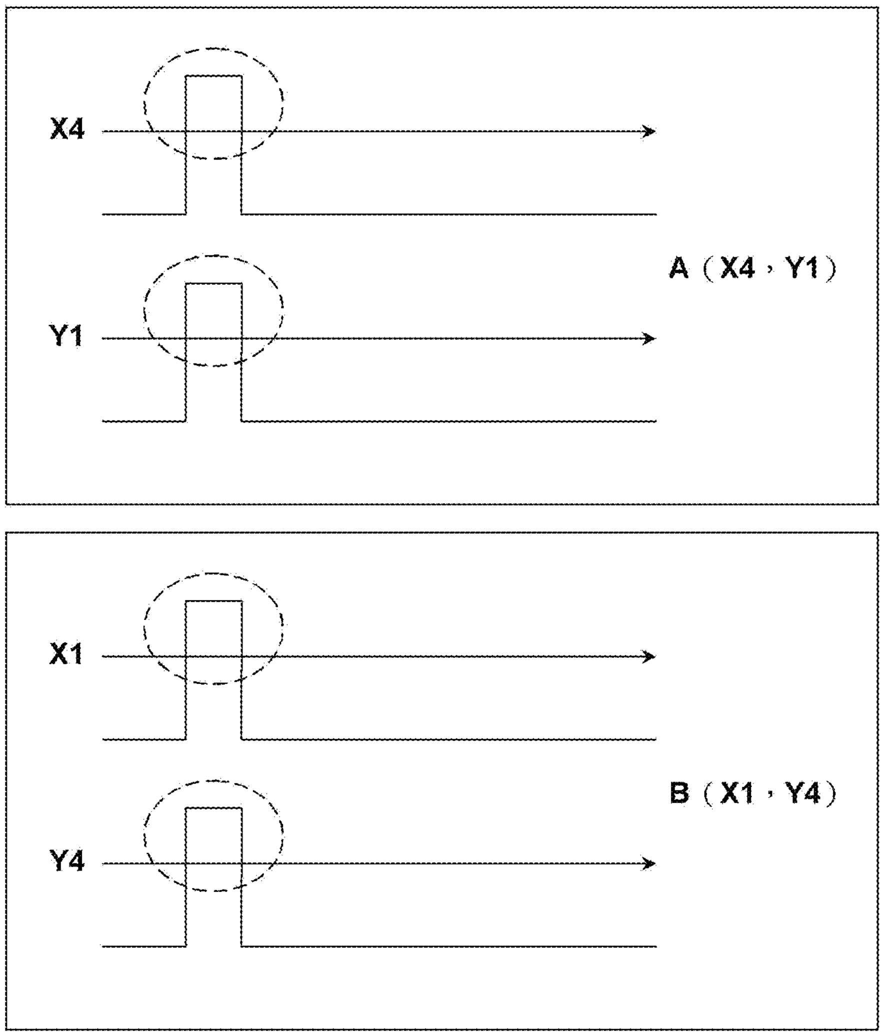

FIG. 5 are schematic views for explaining a driving process for a touch display panel according to the embodiments of this disclosure. Specifically, those are simplified top views of the first substrate 11 of the touch display panel 10, wherein different coordinate positions for the first signal transmission line 13 and the second signal transmission line 14 on the first substrate 11 are indicated by Xi and Yi (i=1, 2, 3, 4, 5). By applying a scanning signal to the gate lines on the corresponding second substrate and detecting output signals at the first signal transmission line and the second signal transmission line respectively when the touch display panel is touched, a touch position can be easily determined. Specifically, when the position where a finger presses the touch display panel is point A as shown in FIG. 5*a*, high level signals on the gate lines will be transmitted simultaneously to the first signal transmission line 13 and the second signal transmission line 14 which are being pressed via the corresponding first signal output end and the second signal output end as well as the first spacer and the second spacer. In this case, corresponding high level signals will be detected respectively at a signal transmission line position X4 and Y1 corresponding to point A with a consistent timing as shown in FIG. 5*b*. The same applies to point B as shown in FIG. 5*a*. Thereby, an intersection position of the first signal transmission line 13 and the second signal transmission line 14 where corresponding output signals are detected simultaneously is determined as the touch position. Therefore, with the touch display panel and the driving method thereof provided in the embodiments of this disclosure, a touch position can be determined exactly and thus multipoint touch control with higher accuracy can be achieved.

This disclosure further provides a touch display device, comprising the touch display panel 10 as described above. Since specific implementations and corresponding technical effects of the touch display device are similar to those of the touch display panel 10 as described above, no more detailed descriptions shall be given here for simplicity.

In summary, this disclosure provides a touch display panel, a driving method thereof and a touch display device comprising such a touch display panel. For such a touch display panel, when the corresponding touch region is in a touch state, a scanning signal applied to the gate lines on the second substrate will be transmitted to the first signal transmission line and the second signal transmission line respectively via the first signal output end and the second signal output end as well as the first spacer and the second spacer. In this case, by detecting output signals with a detection element, a touch position can be easily determined and thus accurate multi-point touch control can be achieved. As compared with the prior art in which the first signal transmission line is used for driving scanning and the second signal transmission line is used for sensing or vice versa, the technical solution provided in this disclosure performs drive scanning by using the gate lines instead of the first signal transmission line or the second signal transmission line, which not only avoids influences on the aperture ratio of the touch panel, but also alleviates problems such as signal interferences between two kinds of drive scanning caused by concurrent use of the drive scanning on the gate lines for driving both display and touch sensing.

It should be understood that in the description of this disclosure, orientational or positional relations indicated by terms such as “center”, “up”, “down”, “front”, “back”, “left”, “right”, “vertical”, “horizontal”, “top”, “bottom”, “interior” and “exterior” are orientational or positional relations based on the drawings. They are used only for describing this disclosure and simplifying the description, instead of indicating or implying that the indicated devices or elements must be orientated specifically, or constructed and operated in a specific orientation. So these terms cannot be understood as limiting this disclosure.

Terms such as “first” and “second” are used for descriptive purposes and should not be understood as indicating or implying relative importance or implicitly indicating the number of the indicated technical feature. Therefore, features defined by “first” and “second” may indicate explicitly or implicitly that one or more such features are comprised. In the description of this disclosure, unless otherwise explained, “multiple” means two or more.

It should be noted that in the description of this disclosure, unless otherwise prescribed and defined, terms such as “mount”, “interconnect” and “connect” should be understood in a broad meaning. For example, they may refer to fixed connection, removable connection or integrated connection. And they may also refer to direct connection, indirect connection via an intermediate medium, or internal connection of two elements. One having ordinary skills in the art can understand specific meanings of the above terms in this disclosure upon specific conditions.

In the description of this specification, specific features, structures, materials or characteristics can be combined in a suitable manner in any one or more embodiments or examples.

What is mentioned above is only specific embodiments of this disclosure, but the protection scope of this disclosure shall not be limited thereto. Any variation or substitution easily conceivable for the skilled person who is familiar with this art within the technical disclosure of this disclosure shall fall within the protection scope of this disclosure. Therefore, the protection scope of this disclosure should be subject to the protection scope of the claims.

The invention claimed is:

1. A touch display panel comprising a first substrate and a second substrate aligned with each other, wherein the touch display panel further comprises:

a first signal transmission line and a second signal transmission line arranged on the first substrate, the second signal transmission line intersecting with the first signal transmission line;

gate lines and data lines arranged on the second substrate, the second substrate being further provided with a first signal output end and a second signal output end arranged alternately, the first signal output end and the second signal output end being electrically connected with the gate lines; and a first spacer corresponding to the first signal transmission line and a second spacer corresponding to the second signal transmission line, the first spacer being used for achieving electrical connection between the first signal transmission line and the first signal output end when a corresponding touch region is in a touch state, and the second spacer being used for achieving electrical connection between the second signal transmission line and the second signal output end when the corresponding touch region is in a touch state, wherein a first insulating layer is further provided on the first signal transmission line and the second signal transmission line, and via holes penetrating the first insulating layer and corresponding to the first signal transmission line and the second signal transmission line respectively are filled with an electrically conductive material, to achieve electrical connections between the first spacer and the first signal transmission line, as well as between the second spacer and the second signal transmission line respectively.

2. The touch display panel according to claim 1, further comprising a second insulating layer formed on the second substrate comprising the gate lines and the data lines, wherein via holes penetrating the second insulating layer are filled with an electrically conductive material, such that the electrically conductive material extends to a position corresponding to the first spacer and is exposed to an uppermost layer of the second substrate so as to obtain the first signal output end; and via holes penetrating the second insulating layer are filled with an electrically conductive material, such that the electrically conductive material extends to a position corresponding to the second spacer and is exposed to an uppermost layer of the second substrate so as to obtain the second signal output end.

3. The touch display panel according to claim 2, wherein the second insulating layer comprises a gate insulating layer sandwiched between the gate line layer and the data line layer, as well as a passivation layer positioned over the data line layer.

4. The touch display panel according to claim 3, wherein the second signal output end is further connected in series with a thin film transistor switch.

5. The touch display panel according to claim 4, wherein the thin film transistor switch comprises a gate, a gate insulating layer and an active layer sequentially arranged in the same layer as the gate lines, as well as a source and a drain arranged in the same layer as the data lines, wherein via holes penetrating the gate insulating layer and the passivation layer as well as via holes penetrating the passivation layer are both filled with an electrically conductive material, such that the source is electrically connected with the gate lines, and via holes penetrating the passivation layer are filled with an electrically conductive material, such that the drain is electrically connected with the electrically conductive material exposed to the uppermost layer of the second substrate.

6. The touch display panel according to claim 2, wherein the first spacer and the second spacer are both arranged on the first substrate, wherein a bottom of the first spacer is electrically connected with a side of the first signal transmission line close to the second substrate, wherein when the corresponding touch region is in a non-touch state, a top of the first spacer is spaced from the first signal output end on the second substrate at a certain distance, and when the corresponding touch region is in a touch state, the top of the first spacer is in contact with the first signal output end on the second substrate; and a bottom of the second spacer is electrically connected with a side of the second signal transmission line close to the second substrate, wherein when the corresponding touch region is in a non-touch state, a top of the second spacer is spaced from the second signal output end on the second substrate at a certain distance, and when the corresponding touch region is in a touch state, the top of the second spacer is in contact with the second signal output end on the second substrate.

7. The touch display panel according to claim 6, wherein by coating surfaces of corresponding spacers and surfaces of corresponding signal transmission lines with an electrically conductive material and forming electrically conductive paths therebetween, electrical connections between the first spacer and the first signal transmission line, as well as between the second spacer and the second signal transmission line are achieved respectively.

8. The touch display panel according to claim 1, wherein the first substrate is a color filter substrate, and the second substrate is an array substrate.

9. The touch display panel according to claim 2, wherein the first spacer and the second spacer are both arranged on the second substrate, wherein a bottom of the first spacer is electrically connected with the first signal output end on the second substrate, wherein when the corresponding touch region is in a non-touch state, a top of the first spacer is spaced from the first signal transmission line on the first substrate at a certain distance, and when the corresponding touch region is in a touch state, the top of the first spacer is in contact with the first signal transmission line on the first substrate; and a bottom of the second spacer is electrically connected with the second signal output end on the second substrate, wherein when the corresponding touch region is in a non-touch state, a top of the second spacer is spaced from the second signal transmission line on the first substrate at a certain distance, and when the corresponding touch region is in a touch state, the top of the second spacer is in contact with the second signal transmission line on the first substrate.

10. The touch display panel according to claim 9, wherein by coating surfaces of corresponding spacers and surfaces of corresponding signal output ends with an electrically conductive material and forming electrically conductive paths therebetween, electrical connections between the first spacer and the first signal output end, as well as between the second spacer and the second signal output end are achieved respectively.

11. The touch display panel according to claim 9, wherein when the corresponding touch region is in a touch state, contacts of the first spacer and the second spacer with an opposite substrate are achieved respectively by means of deformation of the first substrate.

12. The touch display panel according to claim 1, wherein the first signal transmission line is an array of sensors for determining transversal coordinates in the corresponding touch region, and the second signal transmission line is an array of sensors for determining longitudinal coordinates in the corresponding touch region.

13. The touch display panel according to claim 1, wherein an insulating shield layer between the first signal transmission line and the second signal transmission line is provided at an intersection of the first signal transmission line and the second signal transmission line.

14. The touch display panel according to claim 1, wherein the first signal transmission line is formed by a metal wire, and the second signal transmission line is formed by a metal wire and an electrically conductive bridging structure.

15. The touch display panel according to claim 6, wherein when the corresponding touch region is in a touch state, contacts of the first spacer and the second spacer with an opposite substrate are achieved respectively by means of deformation of the first substrate.

16. The touch display panel according to claim 1, wherein the first spacer and the second spacer are spherical or columnar.

17. The touch display panel according to claim 1, wherein the first substrate further comprises a black matrix layer, the first signal transmission line and the second signal transmission line being arranged on a side of the black matrix layer close to the second substrate.

18. The touch display panel according to claim 1, wherein the first signal transmission line on the first substrate extends in the same direction as the gate lines on the second substrate, and the second signal transmission line on the first substrate extends in the same direction as the data lines on the second substrate.

19. The touch display panel according to claim 1, further comprising a primary spacer positioned between the first substrate and the second substrate for maintaining a general cell thickness of the touch display panel, wherein the primary spacer is in physical contact with the first substrate and the second substrate.

20. A touch display device, comprising the touch display panel according to claim 1.

21. A method for driving the touch display panel according to claim 1, comprising:

applying a scanning signal to the gate lines on the second substrate; and detecting output signals at the first signal transmission line and the second signal transmission line on the first substrate respectively, wherein, if the corresponding touch region is in a touch state, an intersection position of the first signal transmission line and the second signal transmission line where corresponding output signals are detected simultaneously is determined as a touch position.

* * * * *